United States Patent Office 2,870,215
Patented Jan. 20, 1959

2,870,215

DISPROPORTIONATION OF ORGANIC SULFOXIDES

Horace R. Davis, Jr., Cedar Grove, and David P. Sorensen, Bloomfield, N. J., assignors to The M. W. Kellogg Company, Jersey City, N. J., a corporation of Delaware No Drawing. Application February 21, 1956
Serial No. 566,762

12 Claims. (Cl. 260—607)

This invention relates to the production of organic sulfones and organic sulfides by catalytic disproportionation of organic sulfoxides using osmium tetroxide as a catalyst.

Organic sulfones are useful as extraction solvents for various chemical compounds such as polyacrylonitrile and the like and are also useful as solvents for aromatic hydrocarbons. Owing to their unusual thermal stability, the sulfones are also useful as heat transfer agents and, although unaffected by aqueous acids and aqueous alkalies, with certain reagents the sulfones act as chemical intermediates in the preparation of metal complexes which are useful in electroplating, azo dyes, mercaptans and the like.

Certain sulfones such as sulfonal, tetronal, and the like are useful medicinally as hypnotics, and aryl sulfones have been found to be useful as paper impregnators in capacitors. The sulfones are also used with aryl compounds as ingredients of dielectric fluids, and other applications include insecticides, bactericides, intestinal antiseptics, tanning agents, and the like. Although the sulfones have a wide range of uses, their application has been restricted prior to the present invention due to the expensive and lengthy processes heretofore employed for their production.

Organic sulfides have been successfully oxidized to sulfoxides using air as an oxidizing agent, but further oxidation to the sulfone has required the use of chemical reagents such as hydrogen peroxide, nitric acid, potassium permanganate, chromic acid and the like.

Among the organic sulfoxides which may be disproportionated in accordance with the present invention are those having the formula

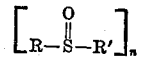

in which $n$ is an integer from 1 to 100 or more and R and R' may be identical or different organic radicals such as saturated aliphatic radicals of the homologous series, methyl, ethyl, propyl, butyl, cetyl, eicosyl, heptacontyl, and the like, and isomers thereof; mono- and polyolefinic aliphatic radicals derived from the homologous series of unsaturated compounds ethylene, propylene, butylene, and the like, and propadiene, butadiene, and the like, and isomers thereof; saturated cyclic radicals derived from cyclobutane, cyclopentane, cyclohexane, and the like, and isomers thereof; unsaturated cyclic radicals derived from cyclobutene, cyclohexene, cyclooctatetrane, cyclohexadiene, cyclopentadiene, and the like, and isomers thereof; saturated and unsaturated heterocyclic radicals derived from quinoline, pyrrolidine, pyrrole, thiophene, indole, carbazole, pyridine, acridine, and the like, and isomers thereof; and aromatic radicals derived from benzene, naphthalene, anthracene, and the like, including substituted aromatic radicals such as those derived from styrene, ethyl benzene, toluene, xylene, diethyl benzene, and the like.

The carbon atoms of the sulfoxide may be partially or totally substituted with any of the halogens; alkyl radicals derived from the homologous series ethane, propane, ethylene, and the like, and isomers thereof; olefinic radicals derived from the homologous series ethylene, propylene, butylene, and the like, and isomers thereof; diolefinic radicals derived from butadiene, and the like, and isomers thereof; and/or with functional groups such as C=O, $NO_2$, $NH_2$, COOH, COOR, SO, and the like.

Organic sulfoxides which may be disproportionated in accordance with the invention also include organic polysulfoxides in which the sulfoxide groups are separated by at least one carbon atom, the following formula being exemplary of this type of polysulfoxide

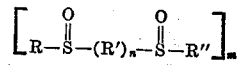

in which $n$ and $m$ are integers from 1 to 100 or more, $n$ preferably being an integer between 1 and about 10 and $m$ preferably being an integer between 1 and 20. R, R', and R" are identical or different radicals and may be any of those listed for R and R' above.

Heterocyclic organic sulfoxides may also be disproportionated to sulfones using osmium tetroxide as a catalyst, exemplary of sulfoxides of this type being tetramethylene sulfoxide, thioazole sulfoxide, thioxane sulfoxide, and the like.

The preferred organic sulfoxides which are disproportionated in accordance with this invention are those having between 2 and about 50 carbon atoms, and although higher molecular weight sulfoxides are disproportionated just as readily, applications of the resulting sulfones are not as numerous as are those of the lower molecular weight sulfones. At least one of the products of the disproportionation reaction is a sulfone regardless of the type of sulfoxide used, i. e., aromatic, aliphatic, cyclic, heterocyclic, or polysulfoxide.

The reactions depicted below illustrate the proposed mechanism of the disproportionation

1. INTERMOLECULAR DISPROPORTIONATION

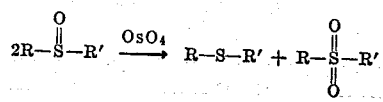

or

2. INTRAMOLECULAR DISPROPORTIONATION

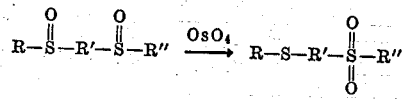

The disproportionation reactions of the invention are conducted in an aqueous or non-aqueous system, and when an aqueous system is used the rate and heat of reaction are more easily controlled; however, it is necessary to use a larger amount of osmium tetroxide catalyst in the dilute solution. Either of these systems may be used in the reaction with equal facility as each possesses particular advantages.

The non-aqueous reaction system may be used in the absence of a diluent, or if a diluent is desired it must be of a type which will not reduce the catalyst. For example, alcohols and aldehydes are not suitable, but exemplary of useful solvents are chloroform, ether, benzene, nitrobenzene, toluene, xylene, acetic acid, and cyclohexane.

The weight ratio of osmium tetroxide to organic sulfoxide in an aqueous disproportionation reaction varies between about $1 \times 10^{-8}$ to 1 and about $1 \times 10^{-1}$ to 1, preferably between $1 \times 10^{-5}$ to 1 and about $1 \times 10^{-2}$ to 1, whereas in a non-aqueous disproportionation reaction the weight ratio varies between about $1 \times 10^{-10}$ to 1 and about $1 \times 10^{-2}$ to 1, preferably between about $1 \times 10^{-7}$ to 1 and about $1 \times 10^{-3}$ to 1. Usually the weight ratio in an aqueous system varies between about $1 \times 10^{-4}$ to 1 and about $1 \times 10^{-2}$ to 1, whereas in a non-aqueous system it varies between about $1 \times 10^{-5}$ to 1 and about $1 \times 10^{-3}$ to 1. Larger amounts of catalyst may be used, if desired, but such larger amounts produce no process advantage.

In an aqueous system, the reaction is effected at a temperature in the range of about 30 to about 200° C., preferably between about 50 and 150° C., and while a small amount of product is obtained almost immediately, the reaction may continue for a period of about 24 hours or more although the reaction is generally complete in a period of about 1 to 15 hours. The reaction temperature in a non-aqueous system may vary between 30° C. and about 300° C., preferably between about 75° C. and about 200° C., and while some product is obtained immediately the reaction may be continued for about a period of about 20 hours or more, although a period of not more than 10 hours is generally sufficient to complete the disproportionation.

The disproportionation reaction may be conducted in a batchwise or continuous manner, and in the batch process the sulfoxide and osmium tetroxide are introduced into a reactor and the temperature is then increased to the reaction temperature. Since the reaction is exothermic, the reaction continues without the addition of further heat after the reaction temperature is reached, and in some cases where very low molecular weight sulfoxides are used in large quantities it may be necessary to cool the reaction mixture in order to avoid degradation of the sulfoxide. The rate of reaction may be controlled by initially introducing the osmium tetroxide catalyst and a small portion of the sulfoxide into the reactor, after which the remaining sulfoxide is gradually added. The reaction products are isolated by distillation or any other convenient method and the products may be characterized by boiling point, melting point, mixed melting point and infrared studies.

The disproportionation reactions are preferably effected at atmospheric pressure; however, pressures up to 1000 p. s. i. g. may be used if it is desired to retain lower boiling products or diluents, such as water, within the reaction zone at high temperatures.

One method of operating the disproportionation reaction continuously comprises adding osmium tetroxide catalyst and an organic sulfoxide to a hot tube or container for a prescribed period. When the reaction is complete the sulfone product is removed through the bottom of the tube or container and sulfide is distilled off at the top of the tube or container. The sulfone product is then purified by conventional methods, such as distillation, extraction, crystallization, sublimation, chromatography, and the like.

The invention will be further illustrated by reference to the following specific examples:

EXAMPLE 1

*Catalytic disproportionation of dimethyl sulfoxide*

In a series of experiments small quantities of osmium tetroxide (about 0.1 percent by weight of sulfoxide) were heated with varying quantities of dimethyl sulfoxide while oxygen was bubbled through the mixture of sulfoxide and catalyst. A vigorous exothermic reaction was initiated as the temperature neared 100° C. and this reaction produced dimethyl sulfone in yields of approximately 50 percent of that expected from the direct oxidation of dimethyl sulfoxide to dimethyl sulfone by oxygen and a catalyst. The experiments employed reaction temperatures in the range of 25 to 100° C. and the gases escaping from the reaction flasks were passed through a solid carbon dioxide-acetone cooled trap. It was noted that dimethyl sulfide (B. P. 37–37.5° C., $d_4^{20}=0.864$) was collected in the cold trap in yields approaching 50 percent based on complete reduction of the starting materials. When nitrogen was substituted for oxygen in the reactions, almost identical results were obtained. The presence of water in the reaction mixture did not appear to affect the final results but it did retard the rate of reaction. In the presence of water the vigorous exothermic reaction was found to occur evenly and at a reasonable rate; similar results were obtained in the absence of water by maintaining the temperature of the reaction mixture below 100° C.

The data obtained from this series of experiments are tabulated in the table below:

TABLE 1.—DISPROPORTIONATION OF DIMETHYLSULFOXIDE USING OsO₄

| Run | Temp., °C. | Reaction Time (hrs.) | Gas Used | Pressure | Rate O₂ Addition, moles/hr. | Wt. OsO₄ | Wt. (g.) Sulfoxide | Wt. Isolated (g.) | | | Percent Yield | |
|---|---|---|---|---|---|---|---|---|---|---|---|---|
| | | | | | | | | Sulfide | Sulfoxide | Sulfone | Sulfone | Sulfide |
| 1 | 25 | 16 | O₂ | atm | 0.20 | 100 mg. in 10.0 g. H₂O. | 50.0 | 13.6 | 7.8 | 28.6 | 47.7 | 34.5 |
| 2 | 60 | 16 | O₂ | atm | 0.20 | 100 mg. in 10.0 g. H₂O. | 50.0 | 14.8 | 4.7 | 27.8 | 46.4 | 37.6 |
| 3 | 90 | 16 | O₂ | atm | 0.20 | 50 mg | 50.0 | 17.9 | 2.3 | 30.5 | 50.4 | 45.2 |
| 4 | 100 | 4 | O₂ | atm | 0.20 | 50 mg | 50.0 | 19.4 | 2.3 | 29.7 | 49.4 | 48.8 |
| 5 | 100 | 3 | O₂ | 250 lb./in.² | 0.20 | 50 mg | 100.0 | 2.1 | 78.1 | 19.5 | 16.3 | 2.6 |
| 6 | 25 | 36 | N₂ | atm | | 50 mg | 50.0 | 14.5 | 3.8 | 27.9 | 46.6 | 36.5 |
| 7 | 100 | 10 min. | N₂ | atm | | 50 mg | 50.0 | 18.9 | 2.6 | 28.8 | 48.0 | 47.6 |
| 8 | 25 | 24 | O₂ | 1,150 lbs./in.² | | 50 mg | 50.0 | 1.7 | 39.1 | 8.2 | 13.7 | 4.3 |

EXAMPLE 2

A further series of experiments was conducted using the general procedure of Example 1 above in which various organic sulfoxides were disproportionated. The only outstanding difference in the disproportionation reactions was the temperature at which the disproportionation reaction was initiated, this temperature varying from 100° C. for dimethyl sulfoxide to 200° C. for diphenyl sulfoxide. Increased degradation of the reacting sulfoxide with increased temperature of initiation was noted for all sulfoxides except diphenyl sulfoxide. The degradation products were observed to be mercaptans, and in experiments involving a mixed methyl sulfoxide, a polymer of formaldehyde (M. P. 160–165° C.) was also found to be present by the chromotropic acid color test.

The data obtained in this series of experiments are tabulated in Table 2 below:

TABLE 2.—DISPROPORTIONATION OF SULFOXIDES USING OsO4

| Sulfoxide Used | Temp., °D. | Time, hrs. | Weight | | Wt. Isolated, g. | | | Percent Yield (Based on Disproportionation Reaction) | |
|---|---|---|---|---|---|---|---|---|---|
| | | | Sulfoxide, g. | OsO4, mg. | Sulfoxide | Sulfide | Sulfone | Sulfone | Sulfide |
| Methyl Phenyl | 175–180 | 1 | 25.0 | 50 | 3.1 | 10.3 | 8.4 | 60.4 | 92.2 |
| Methyl Octyl | 140–145 | 1 | 15.0 | 50 | 3.6 | 6.3 | 4.3 | 52.8 | 92.8 |
| Thiodiglycol | 150–155 | ½ | 30.0 | 50 | | 4.8 | | | 35.8 |
| Diphenyl | 200–205 | 48 | 10.0 | 50 | 1.3 | 4.1 | 3.9 | 71.6 | 88.0 |
| Thioxane | 140 | 1 | 10.0 | 50 | 3.4 | 1.8 | 2.6 | 48.6 | 43.6 |

EXAMPLE 3

Effective concentration of osmium tetroxide

The catalyst was prepared by adding 1.00 gram of osmium tetroxide to sufficient distilled water to make 500.0 ml. of solution. Portions of this solution were then pipetted out and again diluted to the desired concentration. A similar solution was prepared using ether as a solvent and in experiments involving ether, the ether was removed from the dimethyl sulfoxide solution under vacuum prior to heating.

Data for the individual experiments are tabulated in Tables 3 and 4 below:

TABLE 3.—CONCENTRATION OF OsO4 NECESSARY FOR DISPROPORTIONATION OF DIMETHYLSULFOXIDE

[130° C. in 10.0 ml. of water using 50.0 g. sulfoxide]

| Run | Conc. of Catalyst, g. OsO4/g. Me2SO | Wt. Isolated, g. | | | Percent Yield (Based on Disproportionation) | | Time, hrs. |
|---|---|---|---|---|---|---|---|
| | | Sulfide | Sulfoxide | Sulfone | Sulfide | Sulfone | |
| 1 | 2×10⁻³ | 17.41 | 1.47 | 29.63 | 87.6 | 99.0 | 8 |
| 2 | 2×10⁻⁴ | 5.31 | 41.46 | 8.71 | 26.8 | 29.0 | 8 |
| 3 | 8×10⁻⁵ | 2.17 | 42.91 | 3.46 | 10.9 | 11.5 | 16 |
| 4 | 2×10⁻⁵ | 1.46 | 44.93 | 2.94 | 7.3 | 9.8 | 16 |
| 5 | 8×10⁻⁶ | trace | 48.61 | trace | | | 16 |

TABLE 4.—CONCENTRATION OF OsO4 NECESSARY FOR DISPROPORTIONATION OF DIMETHYL SULFOXIDE AT 130° C. IN 4 HRS.

[Ether used as diluting solvent for OsO4]

| Run | Conc. of Catalyst, g. OsO4/g. Me2SO | Wt. Isolated, g. | | | Percent Yield (Based on Disproportionation) | |
|---|---|---|---|---|---|---|
| | | Sulfoxide | Sulfide | Sulfone | Sulfide | Sulfone |
| 1 | 1×10⁻⁵ | 39.74 | 3.29 | 5.72 | 17.0 | 19.0 |
| 2 | 1×10⁻⁶ | 38.61 | 3.97 | 6.88 | 20.0 | 22.8 |
| 3 | 1×10⁻⁷ | 47.38 | 0.98 | 1.42 | 4.8 | 4.7 |
| 4 | 1×10⁻⁸ | 50.0 | trace | trace | | |

EXAMPLE 4

Effective life of osmium tetroxide in the disproportionation of dimethyl sulfoxide The effective life of the osmium tetroxide catalyst was determined by disproportionation of dimethyl sulfoxide (200.0 ml., 222.0 grams, 2.85 moles) with osmium tetroxide (50 mg.), removing the sulfide and the sulfone formed by distillation and adding 200 ml. of sulfoxide in 50 ml. portions to the residue remaining in the reaction flask after product removal and repeating the cycle. The sulfoxide was added to the reaction flask at a rate just sufficient to maintain the disproportionation reaction smoothly at 130 to 150° C. The sulfide was distilled directly during the reaction and the sulfone was removed under vacuum after the addition of 200 ml. of sulfoxide. After 125 ml. of sulfoxide had been added in the third cycle a definite degradation was observed, the degradation products including methylene-bis-methyl sulfide (B. P. 148–149° C.) and a polymer of formaldehyde (M. P. 160–165° C.). Approximately the theoretical amounts of sulfide and sulfone were isolated from all cycles up to the point where degradation was first observed.

It will be obvious to those skilled in the art that many modifications may be made within the scope of the present invention without departing from the spirit thereof and the invention includes all such modifications.

We claim:

1. A process which comprises contacting an osmium tetroxide catalyst with an organic sulfoxide having between 2 and 50 carbon atoms selected from the group consisting of

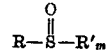

and

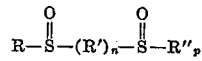

where R, R' and R" are each selected from the group consisting of alkyl, alkenyl, monocycloalkyl, monocycloalkenyl, phenyl, oxygen heterocyclic and nitrogen heterocyclic radicals; to produce a sulfone as a product of the process.

2. A process which comprises contacting an aliphatic hydrocarbon sulfoxide having between 2 and 50 carbon atoms with osmium tetroxide in a weight ratio of between about 1:1×10⁻¹⁰ and about 1:1×10⁻¹ at a temperature of between about 30° C. and about 300° C. to produce an aliphatic hydrocarbon sulfone as a product of the process.

3. A process which comprises contacting dimethyl sulfoxide with osmium tetroxide in a non-aqueous system in a weight ratio of between about 1:1×10⁻⁷ and about 1:1×10⁻³ at a temperature of between about 75° C. and about 200° C. to produce dimethyl sulfone as a product of the process.

4. A process which comprises contacting dimethyl sulfoxide with osmium tetroxide in an aqueous system in a weight ratio of between about $1:1\times10^{-5}$ and about $1:1\times10^{-2}$ at a temperature of between about 50° C. and about 150° C. to produce dimethyl sulfone as a product of the process.

5. A process which comprises disproportionating and oxidizing an organic sulfoxide in the presence of osmium tetroxide as a catalyst to produce a sulfone as a product of the process.

6. A process which comprises disproportionating and oxidizing an organic polysulfoxide in the presence of osmium tetroxide as a catalyst to produce a sulfone as a product of the process.

7. A process which comprises disproportionating and oxidizing a hydrocarbon sulfoxide having between 2 and 50 carbon atoms in the presence of osmium tetroxide at an elevated temperature to produce a hydrocarbon sulfone.

8. The process of claim 5 wherein the organic sulfoxide comprises thioxane sulfoxide.

9. The process of claim 5 wherein the organic hydrocarbon sulfoxide comprises dimethyl sulfoxide.

10. The process of claim 5 wherein the organic hydrocarbon sulfoxide comprises diphenyl sulfoxide.

11. The process of claim 5 wherein the organic hydrocarbon sulfoxide comprises methyl phenyl sulfoxide.

12. The process of claim 5 wherein the organic hydrocarbon sulfoxide comprises methyl octyl sulfoxide.

No references cited.